No. 859,283. PATENTED JULY 9, 1907.
P. J. COLLINS.
POWER CONVERTING AND TRANSMITTING MECHANISM.
APPLICATION FILED OCT. 12, 1904.
2 SHEETS—SHEET 2.
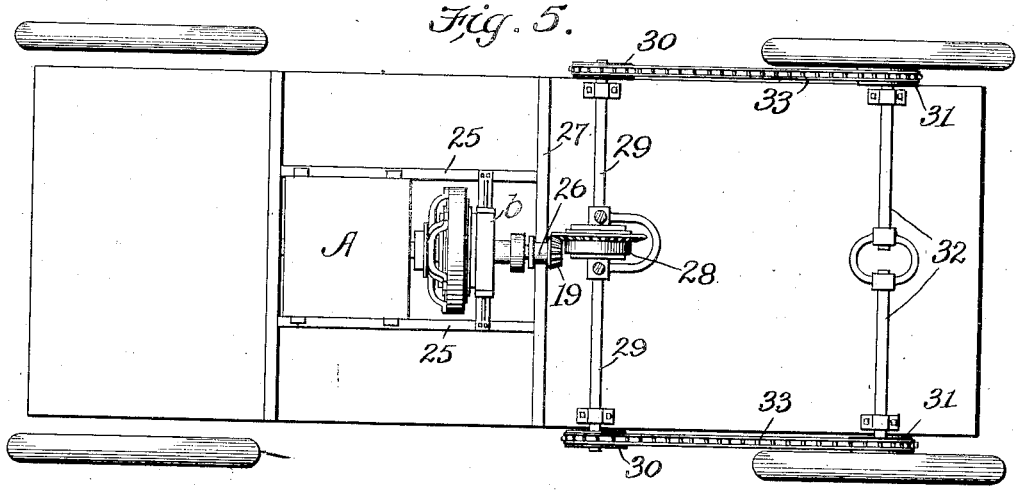
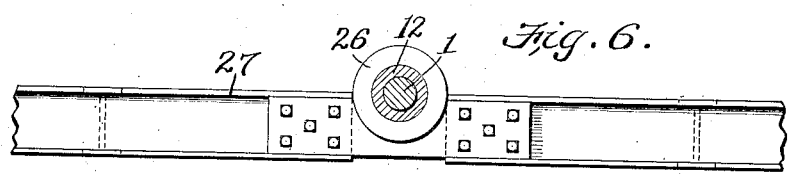
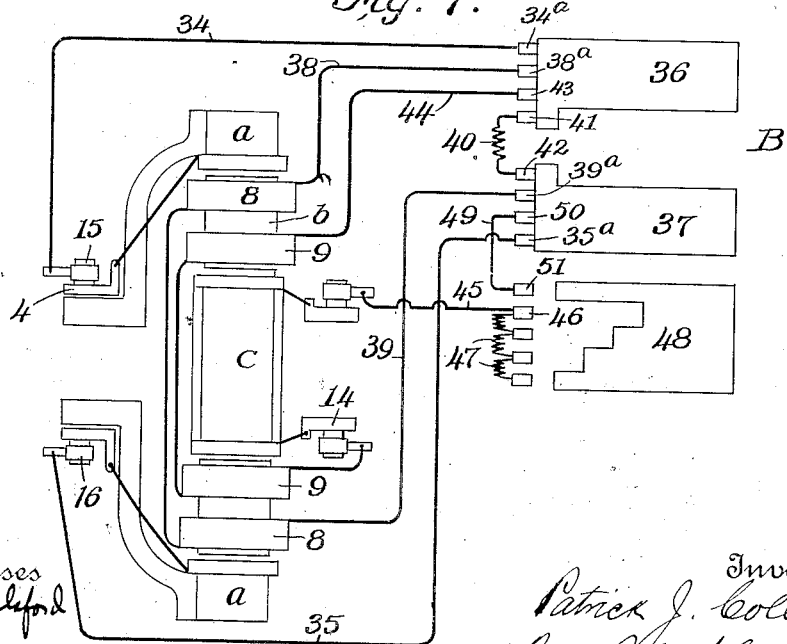
Witnesses
Ernest Pulford
W. E. Schoenborn
Inventor
Patrick J. Collins
By Robert Watson
Attorney

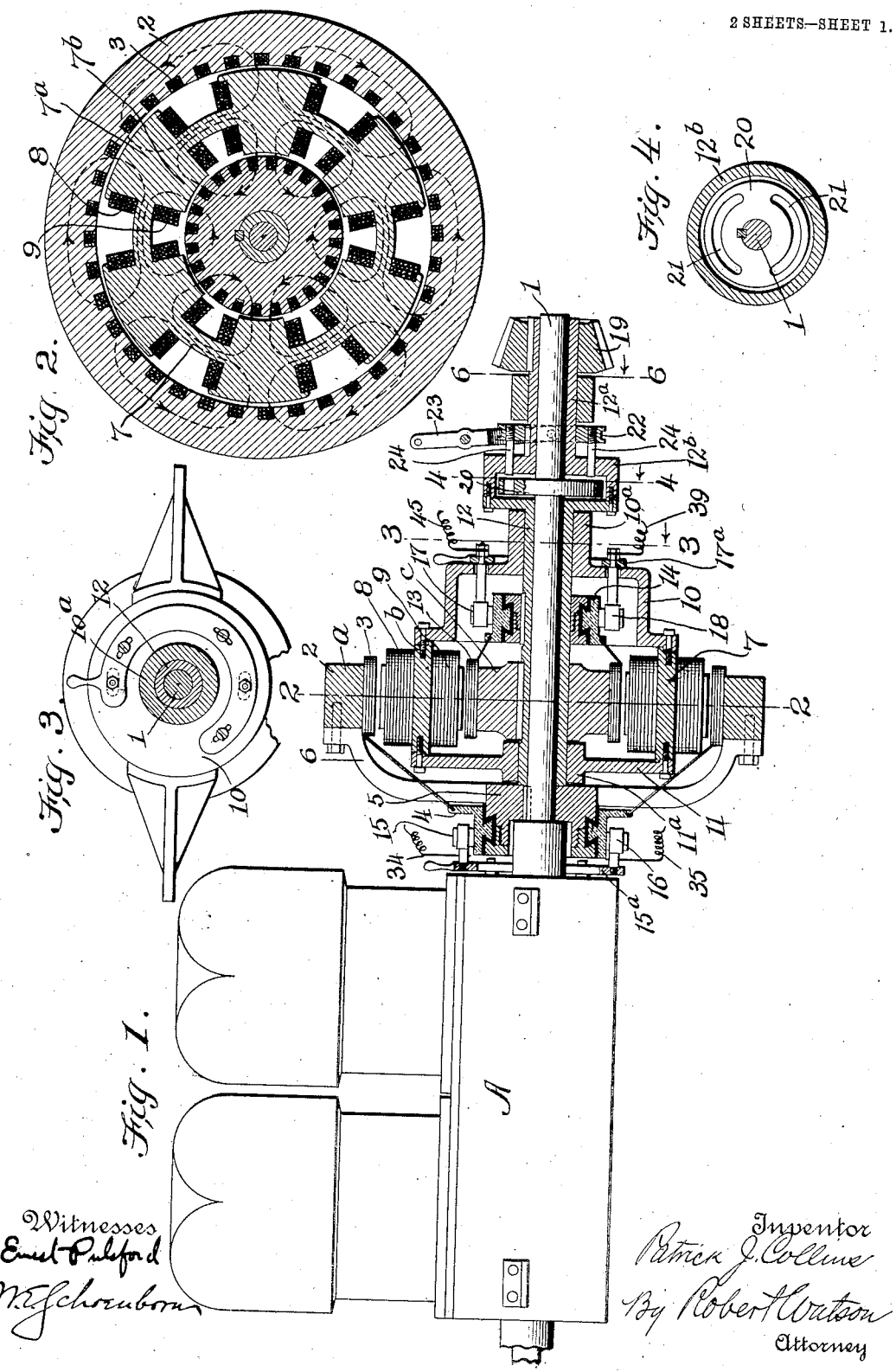

UNITED STATES PATENT OFFICE.

PATRICK J. COLLINS, OF SCRANTON, PENNSYLVANIA, ASSIGNOR, BY MESNE ASSIGNMENTS, TO GENERAL ELECTRIC COMPANY, A CORPORATION OF NEW YORK.

POWER CONVERTING AND TRANSMITTING MECHANISM.

No. 859,283.  Specification of Letters Patent.  Patented July 9, 1907.

Application filed October 12, 1904. Serial No. 228,199.

*To all whom it may concern:*

Be it known that I, PATRICK J. COLLINS, a citizen of the United States, residing at Scranton, in the county of Lackawanna and State of Pennsylvania, have invented certain new and useful Improvements in Power Converting and Transmitting Mechanism, of which the following is a specification.

My invention comprises improvements in power mechanism for operating automobiles and other classes of machinery where it is desired to frequently start and stop the mechanism and to run at variable speeds. In operating mechanism of this kind with explosive engines, which cannot be efficiently or practically operated at both low and high speeds, it is customary to start the engine and allow it to run constantly at full speed, and then, by means of a clutch, connect the engine to the load, the changes in speed being effected by various combinations of changeable speed gearing. If it is desired with an explosive engine to operate the driven mechanism, such as an automobile, at a high maximum speed, it is necessary to provide a large number of speed changing gears in order to start the mechanism and bring it up to its maximum speed without sudden changes in speed, and, in practice, each change in speed is necessarily accompanied by a sudden jerk. With an automobile designed to run at say fifty miles per hour, using an explosive engine, and changeable speed gearing for running at lower speeds and for bringing the vehicle from a stop up to its maximum speed, a complicated, expensive and heavy arrangement of gearing is required, and the acceleration of the vehicle is accompanied by a series of jerks. On the other hand, when a steam motor, whose speed may be varied at will, is used to drive the mechanism, the motor of course cannot exert its full power until its maximum speed is attained, and therefore, in starting the vehicle, or other mechanism, and while running at low speeds, the full power of the engine is not availed of. By means of my improvements the motor is constantly driven at full speed so that it may develop its maximum power, and the vehicle, or other mechanism to be driven, may be started and operated at any desired speed, with full power and without sudden speed changes.

In carrying out my invention I provide an electric generator, actuated by a prime motor, an electric motor driven by the current from said generator and having its armature shaft operatively connected to the load, the electric motor being variable in speed, and means for connecting the prime motor directly to the load when the vehicle, or other mechanism approaches or attains its maximum speed, the electrical apparatus being then thrown out of action. In carrying out my invention, I also provide an improved form of dynamo electric machine, specially adapted for the purpose stated, the construction and operation of which will be clear from the following specification, and the drawing.

In the accompanying drawing, which illustrates my invention—Figure 1 shows the combined engine and dynamo electric machine, the former being shown in side view and the latter in longitudinal vertical section; Fig. 2 is a section on the line 2—2 of Fig. 1; Fig. 3 is a section on the line 3—3 of Fig. 1; Fig. 4 is a section on the line 4—4 of Fig. 1; Fig. 5 is a plan view showing the combined machine applied to a motor vehicle; Fig. 6 is a section on the line 6—6 of Fig. 1; Fig. 7 is a diagram illustrating one arrangement of circuits for the dynamo electric machine, the generator being shunt wound and the motor portion of the machine being series wound.

Referring to Figs. 1 to 7, inclusive of the drawings, A indicates a prime motor, which may be of any suitable type, and which, in the drawing is illustrated in outline as a two-cylinder engine. My improvements are especially adapted for use in connection with explosive engines which ordinarily run at a constant speed, and which cannot be varied in speed to correspond with desired changes in the speed of a vehicle, or other mechanism. The engine shaft 1 is extended to some distance from the engine casing and forms the main driving shaft for the apparatus.

The dynamo electric machine comprises an outer member $a$, which, as shown, is an armature having a core 2 and windings 3 connected to the commutator 4, which is mounted upon the hub 5 of a spider 6, which supports the core of the armature. The hub 5 is keyed to the driving shaft 1 so that the outer member will turn with the driving shaft. Within the outer member $a$ is arranged an intermediate member $b$, consisting, as shown in Figs. 1 and 2, of a ring-core 7, having a series of exterior polar projections $7^a$ and an interior series of polar projections $7^b$ provided with windings 8 and 9 respectively. The intermediate member is supported by a stationary frame comprising the two parts 10 and 11. These parts have central bearings $10^a$ and $11^a$ respectively, in which a tubular armature shaft 12 is journaled. Within the intermediate member is arranged an inner member $c$, consisting of an armature which is keyed to the shaft 12 and whose windings 13 are connected to a commutator 14 upon said shaft. The intermediate member, as shown, is a double field, the outer series of poles $7^a$ co-acting with the coils of the outer member and forming a generator, while the inner series of poles $7^b$ co-act with the inner member $c$ and form a motor. The current from the outer member or armature $a$ is taken from the commutator 4 by brushes 15 and 16, supported by a rocker $15^a$, and conducted, through suitable controlling devices, to the fields of the intermediate member, and to the brushes 17 and 18, supported by a rocker 17ª, which rest upon the commutator 14 and conduct the current to the coils of the inner member c.

It will be seen that when the outer member is rotated by the prime motor A, for which said member serves as a fly-wheel, the current taken from said member and admitted to the members b and c will cause the member c to turn the tubular shaft 12. The shaft 12 has an extension 12ª carrying a bevel gear 19 and the two parts of the shaft 12 are provided with flanges which, when connected together, form a hollow casing 12ᵇ, inclosing a disk 20, which, as shown in Fig. 4, is keyed to the driving shaft. This disk is provided with arcuate slots 21, and a clutch disk 22, movable longitudinally upon the shaft 12 by means of a lever 23, is provided with pins 24 adapted to enter the slots 21. By moving the lever 23, it will be seen that the shafts 1 and 12 may be coupled together or released from one another.

When the clutch is released the engine driving shaft 1 will turn within the tubular shaft 12 without rotating the pinion 19, with which the load to be driven is connected. The engine therefore, may be rotated at a constant speed and at maximum power and the pinion 19 may be driven at a variable speed with maximum torque by the armature c which derives current from the outer member a, the latter being constantly driven by the engine. It will thus be seen that the motor vehicle, or other mechanism, which is to be operated, may be started, while the engine is running at full speed, without jerking, and may be operated by electric power at any speed desired below the maximum speed at which it would be driven if geared directly to the engine shaft. When the tubular armature shaft 12 is brought up to a speed approaching, or equal to the speed of the driving shaft 1, the clutch may then be operated to connect the shafts 1 and 12 together and the vehicle, or other load, will then be driven directly by the engine, the motor circuits being then of course interrupted by any suitable switching device, such as the controller B shown diagrammatically in Fig. 7, and hereinafter referred to, and in which the controller is shown in its first operative step. As the electrical machine is intended mainly for starting and operating at low speeds, and is therefore not in constant use, it may be made of very light weight without danger of over-heating. Where it is intended to run by electrical power most of the time, of course the electrical machine will be proportioned to carry its load.

In Fig. 5 I have shown the combined engine and dynamo electric machine applied to a motor vehicle, the engine A and the intermediate stationary member b being supported between bars 25 and the tubular shaft being supported adjacent to pinion 19 by a suitable bearing 26 upon a cross-bar 27, (see Fig. 6). The pinion 19 drives a differential gear mechanism 28, which is connected to a two-part shaft 29, the latter having gears 30 which are connected to gears 31 upon the driving axles 32 by sprocket chains 33.

In Fig. 7 I have, for illustration shown, one arrangement of circuits for the dynamo electric machine, but it will be understood of course that the machine may be wound and connected in various ways. Referring to Fig. 7 a, b, c indicate the outer, intermediate and inner members respectively, and B indicates a controller. In this view the generator portion of the machine is shunt wound and the motor portion is series wound. The conductors 34 and 35 lead from the commutator 4 of the outer member to the brushes 34ª and 35ª, which bear upon the rings 36 and 37 respectively of the controller. The field windings 8 of the intermediate member are also connected by conductors 38 and 39 to the brushes 38ª and 39ª bearing upon said contact rings 36 and 37 respectively. An idle resistance 40 is connected to brushes 41 and 42, which bear upon the rings 36 and 37 respectively, during the first operative step or movement of the controller and which leave said rings immediately after the first step. The motor circuit extends from a contact brush 43, through conductor 44, to the field coils 9 of the intermediate member, thence to the commutator 14 and through the coils of the inner member, and thence by a conductor 45 to the series of brushes 46, which are connected together by suitable resistances 47. The brushes 46 are arranged opposite a stepped segment 48 of the controller, and the first brush in the series is arranged to engage said segments on the second step or movement of the controller. The motor circuit is completed, on the second step of the controller, through a conductor 49, connecting a brush 50 on the ring 37 with a brush 51 which engages the segment 48. It will be seen from the diagram that during the first step of the controller the generator circuits will be completed, the armature circuit of the generator being connected through the resistance 40 so that a small load will be placed upon the engine to keep the latter from racing when running idle, and that when the motor is connected to the circuit this idle resistance will be cut out. When the motor is stopped the engine is apt to race and rattle if not held down by a small load upon the armature of the generator.

Where an explosive engine is used as a prime motor, the engine may be started by admitting current to the armature coils of the outer member and the co-acting field coils of the inner member, in Figs. 1 and 2, from the battery which is ordinarily employed to provide a spark for the explosive engine. After the engine has been started the batteries may be disconnected. The engine, it will be noted, runs at its full speed before the electric machine is brought into action, and, therefore, the full power of the engine may be applied to drive the vehicle electrically from the start. The power applied to the vehicle axles, therefore, is much greater in starting than it would be if the engine were geared directly to the axles and had to start under load. As the electrical machine is not in constant use, but is mainly used to carry the vehicle from its state of rest up to its highest speed, and is then cut out of action, the iron of the machine may be worked to a much greater magnetic density than if the machine were constantly in action, and for this reason the machine may be made very light in weight.

In the operation of starting a motor vehicle, the engine is started and allowed to run up to its normal speed, with the clutch disengaged. The engine shaft can turn freely while the engine is starting, as no load is upon it. The outer member a serves as a fly-wheel, and, in starting the vehicle, the current generated in the coils of said member is carried to the field magnet coils of the intermediate member, and also to the armature coils of the inner member. The shaft of the inner member being geared to the load, when the inner member starts to move, the vehicle or other load also starts to move. The speed then may be gradually increased or varied to suit the will of the operator by regulating the current admitted to the actuating coils of the inner member. A vehicle for instance, may thus be started and brought up to its highest speed, without sudden changes in speed such as are caused in ordinary vehicles by changeable speed gearing. When the vehicle reaches or approaches its maximum speed, the clutch is thrown to connect the engine shaft with the shaft of the inner member, which carries the driving pinion, and the vehicle will thereafter be driven directly by the engine, and the several circuits of the dynamo electric machine may be interrupted at the controller, so that no current will be generated or wasted during the operation of the vehicle at its high speed.

Having described my invention, what I claim, and desire to secure by Letters Patent, is:

1. The combination with an engine and a driving shaft operatively connected thereto, of a dynamo electric machine comprising an outer member secured to said driving shaft, an intermediate stationary member and an inner rotatable member having a shaft operatively connected to the mechanism which is to be driven and a clutch for connecting said shafts together.

2. The combination with an engine and a driving shaft operatively connected thereto, of a dynamo electric machine comprising an outer member secured to said driving shaft, an intermediate stationary member, an inner rotatable member having a tubular shaft surrounding said driving shaft and operatively connected to the mechanism which is to be driven and a clutch for connecting said shafts together.

3. The combination with an engine and a driving shaft operatively connected thereto, of a dynamo electric machine comprising an outer armature secured to said driving shaft, an inner armature having a shaft operatively connected to the mechanism which is to be driven, an intermediate stationary double-field member coacting with each of said armatures, and a clutch for connecting said inner armature shaft to the driving shaft.

4. The combination with an engine, of an electric generator operated thereby, an idle resistance arranged in a circuit leading from said generator, an electric motor electrically connected to the generator, a switch for controlling the motor, and means for throwing the idle resistance out of circuit with the generator when the motor is started and for throwing said resistance into circuit with the generator when the motor is stopped.

In testimony whereof I affix my signature, in presence of two witnesses.

PATRICK J. COLLINS.

Witnesses:
ROBT. J. MURRAY,
C. A. VAN WORMER.